United States Patent
Barber, Jr. et al.

(10) Patent No.: US 7,169,199 B2
(45) Date of Patent: *Jan. 30, 2007

(54) CURABLE EMULSIONS AND ABRASIVE ARTICLES THEREFROM

(75) Inventors: Loren L. Barber, Jr., Lake Elmo, MN (US); Thomas E. Close, Hudson, WI (US); Yeun J. Chou, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 255 days.

This patent is subject to a terminal disclaimer.

(21) Appl. No.: 10/303,554

(22) Filed: Nov. 25, 2002

(65) Prior Publication Data

US 2004/0102574 A1    May 27, 2004

(51) Int. Cl.
*B24D 3/02* (2006.01)
*B24D 3/28* (2006.01)
*B24D 11/00* (2006.01)
*C09K 3/14* (2006.01)

(52) U.S. Cl. ............... 51/298; 51/295; 51/299; 428/206; 428/423.1; 428/522; 451/28; 451/48; 451/49

(58) Field of Classification Search ............ 428/423.1, 428/206, 522; 525/124, 451
See application file for complete search history.

(56) References Cited

U.S. PATENT DOCUMENTS

| | | | |
|---|---|---|---|
| 2,958,593 A | 11/1960 | Hoover et al. | |
| 3,225,916 A | 12/1965 | Field et al. | |
| 3,971,745 A | 7/1976 | Carlson et al. | |
| 4,018,575 A | 4/1977 | Davis et al. | |
| 4,190,567 A | 2/1980 | Ohmura et al. | |
| 4,227,350 A | 10/1980 | Fitzer | |
| 4,306,998 A | 12/1981 | Wenzel et al. | |
| 4,314,827 A | 2/1982 | Leitheiser et al. | |
| 4,331,453 A | 5/1982 | Dau et al. | |
| 4,355,489 A | 10/1982 | Heyer et al. | |
| 4,357,441 A | 11/1982 | Hamamura et al. | |
| 4,486,200 A | 12/1984 | Heyer et al. | |
| 4,518,397 A | 5/1985 | Leitheiser et al. | |
| 4,522,851 A | 6/1985 | Rosthauser | |
| 4,524,104 A * | 6/1985 | Hagio et al. ............. 428/341 | |
| 4,588,419 A | 5/1986 | Caul et al. | |
| 4,609,380 A | 9/1986 | Barnett et al. | |
| 4,623,364 A | 11/1986 | Cottringer et al. | |
| 4,652,275 A | 3/1987 | Bloecher et al. | |
| 4,734,104 A | 3/1988 | Broberg | |
| 4,737,163 A | 4/1988 | Larkey | |
| 4,744,802 A | 5/1988 | Schwabel | |
| 4,751,137 A | 6/1988 | Halg et al. | |
| 4,770,671 A | 9/1988 | Monroe et al. | |
| 4,799,939 A | 1/1989 | Bloecher et al. | |
| 4,800,685 A | 1/1989 | Haynes, Jr. | |
| 4,826,894 A | 5/1989 | Markusch et al. | |
| 4,835,210 A | 5/1989 | Chin et al. | |
| 4,842,619 A | 6/1989 | Fritz et al. | |
| 4,881,951 A | 11/1989 | Wood et al. | |
| 4,898,597 A | 2/1990 | Hay et al. | |
| 4,927,431 A | 5/1990 | Buchanan et al. | |
| 4,933,373 A | 6/1990 | Moren | |
| 4,991,362 A | 2/1991 | Heyer et al. | |
| 5,011,508 A | 4/1991 | Wald et al. | |
| 5,078,753 A | 1/1992 | Broberg et al. | |
| 5,090,968 A | 2/1992 | Pellow | |
| 5,108,463 A | 4/1992 | Buchanan | |
| 5,137,542 A | 8/1992 | Buchanan et al. | |
| 5,139,978 A | 8/1992 | Wood | |
| 5,152,917 A | 10/1992 | Pieper et al. | |
| 5,201,916 A | 4/1993 | Berg et al. | |
| 5,203,884 A | 4/1993 | Buchanan et al. | |
| 5,227,104 A | 7/1993 | Bauer | |
| 5,273,558 A | 12/1993 | Nelson et al. | |
| 5,282,875 A | 2/1994 | Wood et al. | |
| 5,290,903 A | 3/1994 | Hsu et al. | |
| 5,306,319 A | 4/1994 | Krishnan et al. | |
| 5,328,716 A | 7/1994 | Buchanan | |
| 5,342,888 A * | 8/1994 | Sudo ..................... 525/124 | |
| 5,366,523 A | 11/1994 | Rowenhorst et al. | |
| 5,378,251 A | 1/1995 | Culler et al. | |
| 5,378,252 A | 1/1995 | Follensbee | |
| 5,417,726 A | 5/1995 | Stout et al. | |

(Continued)

FOREIGN PATENT DOCUMENTS

DE         2013860         9/1970

(Continued)

OTHER PUBLICATIONS

Product Information: "ADIPRENE BL-16", Adiprene Vibrathane polyurethane elastomers, Uniroyal Chemical, pp. 1-4 (Date Unknown).
Wicks et al., "Blocked isocyanates III: Part A. Mechanisms and chemistry", ELSEVIER, Progress in Organic Coatings 36 (1999), pp. 148-172.
Wicks et al., "Blocked isocyanates III: Part B: Uses and applications of blocked isocyanates", ELSEVIER, Progress in Organic Coatings 41 (2001), pp. 1-83.
Product Information: "Carbopol® Polymers Can Thicken Without Neutralization", Noveon™, The Specialty Chemicals Innovator©, TDS 43, Jan. 2002.
Product Information: "Carbopol® Polymers in Pharmaceuticals", Carbopol® Polymers, pp. 1-2, http://www.pharma.noveoninc.com/products/carbopol.htm, Nov. 13, 2002.

(Continued)

*Primary Examiner*—Margaret G. Moore

(57) ABSTRACT

A curable emulsion comprises: an oil phase comprising blocked polyisocyanate and curative; and an aqueous phase comprising at least partially neutralized crosslinked copolymer of monomers comprising at least one free-radically polymerizable carboxylic acid and at least one of an alkyl or alkaryl (meth)acrylate. In some embodiments, the curable emulsion further comprises nonionic surfactant. Methods of making the curable emulsions and their use in the manufacture of abrasive articles are also disclosed.

21 Claims, 2 Drawing Sheets

U.S. PATENT DOCUMENTS

| | | | |
|---|---|---|---|
| 5,429,647 | A | 7/1995 | Larmie |
| 5,436,063 | A | 7/1995 | Follett et al. |
| 5,482,756 | A | 1/1996 | Berger et al. |
| 5,490,878 | A | 2/1996 | Peterson et al. |
| 5,492,550 | A | 2/1996 | Krishnan et al. |
| 5,496,386 | A | 3/1996 | Broberg et al. |
| 5,498,269 | A | 3/1996 | Larmie |
| 5,520,711 | A | 5/1996 | Helmin |
| 5,549,962 | A | 8/1996 | Holmes et al. |
| 5,551,963 | A | 9/1996 | Larmie |
| 5,554,068 | A | 9/1996 | Carr et al. |
| 5,556,437 | A | 9/1996 | Lee et al. |
| 5,560,753 | A | 10/1996 | Schnabel et al. |
| 5,563,193 | A | 10/1996 | Abel et al. |
| 5,573,619 | A | 11/1996 | Benedict et al. |
| 5,578,096 | A | 11/1996 | Christianson et al. |
| 5,584,897 | A | 12/1996 | Christianson et al. |
| 5,591,239 | A | 1/1997 | Larson et al. |
| 5,609,706 | A | 3/1997 | Benedict et al. |
| 5,672,186 | A | 9/1997 | Chesley et al. |
| 5,681,361 | A | 10/1997 | Sanders, Jr. |
| 5,681,612 | A | 10/1997 | Benedict et al. |
| 5,700,302 | A | 12/1997 | Stoetzel et al. |
| 5,712,210 | A | 1/1998 | Windisch et al. |
| 5,739,216 | A | 4/1998 | Duecoffre et al. |
| 5,747,166 | A | 5/1998 | Schwarte et al. |
| 5,766,277 | A * | 6/1998 | DeVoe et al. .................. 51/295 |
| 5,807,913 | A | 9/1998 | Mikuni et al. |
| 5,852,120 | A * | 12/1998 | Bederke et al. ............. 525/124 |
| 5,858,140 | A | 1/1999 | Berger et al. |
| 5,919,549 | A | 7/1999 | Van et al. |
| 5,924,917 | A | 7/1999 | Benedict et al. |
| 5,928,070 | A | 7/1999 | Lux |
| 5,942,015 | A | 8/1999 | Culler et al. |
| 5,954,844 | A | 9/1999 | Law et al. |
| 5,961,674 | A | 10/1999 | Gagliardi et al. |
| 5,975,988 | A | 11/1999 | Christianson |
| 6,007,590 | A | 12/1999 | Sanders, Jr. |
| 6,017,831 | A | 1/2000 | Beardsley et al. |
| 6,059,850 | A | 5/2000 | Lise et al. |
| 6,066,188 | A | 5/2000 | Benedict et al. |
| 6,117,931 | A | 9/2000 | Rehfuss et al. |
| 6,207,246 | B1 | 3/2001 | Moren et al. |
| 6,210,840 | B1 | 4/2001 | Usami et al. |
| 6,261,682 | B1 | 7/2001 | Law |
| 6,288,176 | B1 | 9/2001 | Hsieh et al. |
| 6,302,930 | B1 | 10/2001 | Lux |
| 6,328,773 | B1 | 12/2001 | Beardsley et al. |
| 6,635,314 | B1 * | 10/2003 | William et al. .......... 427/385.5 |
| 6,773,474 | B2 * | 8/2004 | Koehnle et al. ............. 51/298 |
| 2002/0065031 | A1 | 5/2002 | Chou et al. |

FOREIGN PATENT DOCUMENTS

| | | |
|---|---|---|
| DE | 42 23 183 C1 | 7/1993 |
| EP | 0 324 334 A1 | 7/1989 |
| EP | 0 626 401 A1 | 11/1994 |
| EP | 0 653 468 A2 | 5/1995 |
| JP | 51086593 A | 7/1976 |
| JP | 53033251 A | 3/1978 |
| JP | S 56-74144 | 6/1981 |
| JP | S 62-151419 | 7/1987 |
| JP | 11-207639 | 1/1998 |
| WO | WO 93/07195 | 4/1993 |
| WO | WO 94/26468 | 11/1994 |
| WO | WO 95/30719 | 11/1995 |
| WO | WO 00/15390 | 3/2000 |
| WO | WO 00/39181 | 7/2000 |

OTHER PUBLICATIONS

Product Information: "Creating Emulsions with Carbopol 1600-Series Polymers", Carbopol® High Performance Polymers for Industrial Specialties, Bulletin IS-9, Revised 4-92, pp. 1-5.

Product Information: "Dispersion Techniques for Carbolpol® Resins", Noveon™, The Specialty Chemicals Innovator©, TDS 103, Rev. Oct. 1993.

Huibers et al., "Evidence for Synergism in Nonionic Surfactant Mixtures: Enhancement of Solubiization in Water-in-Oil Microemulsions", Langmuir 1997, 13, pp. 5762-5765.

Product Information: "How to Prepare Aqueous Dispersions of Carbopol® Resins", Noveon™, The Specialty Chemicals Innovator©, TDS 61, Revised Oct. 1993.

Product Information: "Introducing Pemulen® Polymeric Emulsifiers", Noveon™, The Specialty Chemicals Innovator©, TDS 114, Jan. 2002.

Product Information: Material Safety Data Sheet, "ADIPRENE BL-16", Uniroyal Chemical, Oct. 25, 1985.

Product Information: Material Safety Data Sheet, "ADIPRENE BL-31", Crompton/Uniroyal Chemical, Witco and OSI Specialties Product & Services, Jun. 1, 2000.

Product Information: Solutions Close to Home, "Molecular Weight Of Carbopol® and Pemulen® Polymers", Noveon™, The Specialty Chemicals Innovator©, TDS #222, Rev. Dec. 1999.

Product Information: Polymers for Personal Care, "Neutralizing Carbopol® and Pemulen® Polymers in Aqueous and Hydroalcoholic Systems", Noveon™, The Specialty Chemicals Innovator©, TDS #237, Rev. Oct. 1998.

Product Information: Pemulen® Polymeric Emulsifiers, "Pemulen® Polymeric Emulsifiers in Pharmaceuticals", pp. 1-2, http://www.pharma.noveoninc.com/products/pemulen.htm, Nov. 13, 2002.

Product Information: Noveon™, Pemulem® Resins, Industrial Specialties, "Pemulen Resins/The Universal Emulsifier For Oil-In-Water Emulsions", 1998.

Product Information: Noveon Home Care, Products for Home Care and I & I Applications, Pemulen® 1622 Polymeric Emulsifier, http://www.homecare.noveoninc.com/products/pemulen1622.html, Aug. 6, 2002.

Product Information: Solutions Close to Home, "Pemulen® 1622 Polymeric Emulsifier For Home Care and Industrial & Institutional Applications", Noveon™, The Specialty Chemicals Innovator©, PDS Pemulen 1622, Rev. Nov. 1999.

Product Information: "Pemulen® 1622 Polymeric Emulsifier", Noveon™, The Specialty Chemicals Innovator, 2001.

Becher et al., "The Determination of Hydrophile-Lipophile Balance by Gas-Liquid Chromatography", Presented at National Colloid Symposium, Ottawa, Jun., 1963.

Riser et al., "Evaluation of Butyl Stearate, Butyl Oleate, Butyl Ricinoletate, and Methyl Linoleate as Poly(vinyl Chloride) Plasticizers", The Journal of the American Oil Chemists' Society, Vo. 41, p. 172.

U.S. Appl. No. 10/304,041, filed Nov. 25, 2002, Nonwoven Abrasive Articles and Methods for Making and Using the Same.

U.S. Appl. No. 10/304,222, filed Nov. 25, 2002, Curable Compositions and Abrasive Articles Therefrom.

Product Information: "ADIPRENE BL-16", Adiprene Vibrathene polyurethane elastomers, Uniroyal Chemical, pp. 1-4, prior to Aug. 8, 2002.

Riser et al., "Evaluation of Butyl Stearate, Butyl Oleate, Butyl Ricinoletate, and Methyl Linoleate as Poly(vinyl Chloride) Plasticizers", The Journal of the American Oil Chemists' Society, 1964, pp. 172-174, vol. 41, The American Oil Chemists Society, Chicago, IL.

Product Data: "ADIPRENE BL-16", Water Emulsifiable/Dispersible Reactive Prepolymer, Crompton Uniroyal Chemical, pp. 1-4, Aug. 8, 2002.

Barber, "Curable Compositions And Abrasive Articles Therefrom", U.S. Appl. No. 11/256,815, filed Oct. 24, 2005.

* cited by examiner

US 7,169,199 B2

CURABLE EMULSIONS AND ABRASIVE ARTICLES THEREFROM

TECHNICAL FIELD

The present invention relates to curable emulsions. The present invention also relates to curable emulsions used in the manufacture of abrasive articles.

BACKGROUND

Curable emulsions, in which an oil phase containing a curable material is dispersed in an aqueous phase, are widely used in the manufacture of articles that include a binder material.

A common problem of curable emulsions is their tendency to settle out over time, which may cause handling problems and/or reduce shelf life of the curable emulsion. One approach to addressing the settling issue involves the addition of a relatively large quantity (e.g., approximately 10 percent by weight or more) of emulsifier to the oil phase. Although this approach may provide some relief from settling, on drying and curing the emulsion, the presence of a high amount of emulsifier typically degrades one or more properties (e.g., reduced tensile strength and/or elongation at break) of the resultant cured material (i.e., a material that is polymerized and/or crosslinked to a degree sufficient to impart useful physical properties).

Polyurethanes (i.e., polymers containing urethane and/or urea linkages in the backbone chain) are widely used as binder materials for many applications due to their physical properties (e.g., strength, elongation, and/or toughness).

It would be desirable to have curable emulsions containing materials that are stable for a long time, and that may be dried and cured to provide polyurethanes with good physical properties.

SUMMARY

In one aspect, the present invention provides a curable emulsion comprising:
an oil phase comprising:
blocked polyisocyanate and curative; and
an aqueous phase comprising:
water; and
at least partially neutralized crosslinked copolymer of monomers comprising at least one free-radically polymerizable carboxylic acid and at least one of an alkyl or alkaryl (meth)acrylate, wherein the at least one alkyl or alkaryl (meth)acrylate has from 11 carbon atoms to 34 carbon atoms, and further wherein the aqueous phase has a pH in a range of from about 4 to about 10.

In another aspect the present invention provides a curable emulsion comprising:
an oil phase preparable from components comprising:
blocked polyisocyanate and curative; and
an aqueous phase preparable from components comprising:
water; and
at least partially neutralized crosslinked copolymer of monomers comprising at least one free-radically polymerizable carboxylic acid and at least one of an alkyl or alkaryl (meth)acrylate, wherein the at least one alkyl or alkaryl (meth)acrylate has from 11 carbon atoms to 34 carbon atoms, and further wherein the aqueous phase has a pH in a range of from about 4 to about 10.

In another aspect, the present invention provides a composition comprising a polymerized reaction product of a curable emulsion according to the present invention.

Optionally, curable emulsions and compositions according to the present invention may further comprise nonionic surfactant.

In another aspect, the present invention provides a method for making a curable emulsion according to the present invention, the method comprising:
providing:
blocked polyisocyanate;
curative; and
an aqueous phase comprising:
water; and
at least partially neutralized crosslinked copolymer of monomers comprising at least one free-radically polymerizable carboxylic acid and at least one of an alkyl or alkaryl (meth)acrylate, wherein the at least one alkyl or alkaryl (meth)acrylate has from 11 carbon atoms to 34 carbon atoms, and further wherein the aqueous phase has a pH in a range of from about 4 to about 10;
mixing the blocked polyisocyanate and curative to form a premix; and
mixing the premix with the aqueous phase such that a curable emulsion having a dispersed oil phase is formed, and further wherein, and further wherein nonionic surfactant is present in the curable emulsion in an amount of less than 5 percent by weight, based on the total weight of the oil phase.

In another aspect, the present invention provides an abrasive article comprising abrasive particles and the reaction product of a curable emulsion according to the present invention.

In another aspect, the present invention provides a method of abrading a workpiece comprising:
providing an abrasive article comprising abrasive particles and the reaction product of a curable emulsion according to the present invention;
frictionally contacting at least one abrasive particle of the abrasive article with the surface of a workpiece; and
moving at least one of the at least one abrasive particle or the workpiece relative to the other to abrade at least a portion of the surface with the abrasive particle.

Curable emulsions according to the present invention typically have good resistance to settling, and typically may be cured to form binders having good physical properties. Useful abrasive articles that may be made with curable emulsions according to the present invention include, for example, coated abrasive articles, nonwoven abrasive articles, bonded abrasive articles, and unitary brushes.

In some embodiments, emulsions prepared according to the present invention advantageously contain low levels of volatile organic solvents.

BRIEF DESCRIPTION OF THE DRAWING

FIG. 3b is an enlarged view of a region of the nonwoven abrasive article shown in FIG. 3a;

DETAILED DESCRIPTION

Figure 1:
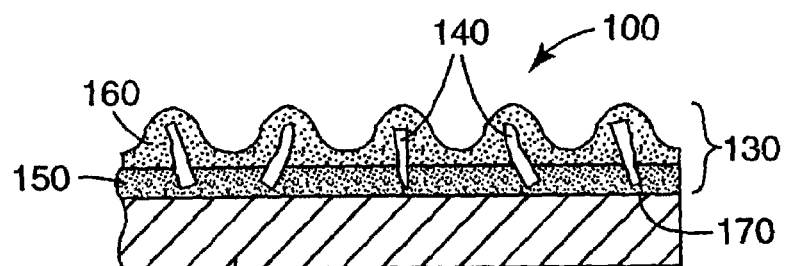
FIGS. 1 and 2 are cross-sectional views of exemplary coated abrasive articles according to the present invention.

Curable emulsions according to present invention comprise an oil phase and an aqueous phase. Typically, the curable emulsions have a continuous aqueous phase and a discontinuous oil phase, although either or both of the oil phase and/or the aqueous phase may be continuous or discontinuous. The oil phase comprises blocked polyisocyanate, curative, and optionally nonionic surfactant. The aqueous phase comprises at least partially neutralized crosslinked copolymer of at least one free-radically polymerizable carboxylic acid and at least one alkyl acrylate.

As used herein, the term "blocked polyisocyanate" refers to either a single blocked polyisocyanate or a mixture of two or more blocked polyisocyanates; the term "curative" refers to either a single curative or a mixture of two or more curatives; the term "nonionic surfactant" refers to either a single nonionic surfactant or a mixture of two or more nonionic surfactants; and the term "neutralized crosslinked copolymer" refers to either a single neutralized crosslinked copolymer or a mixture of two or more neutralized crosslinked copolymers. As used herein, the term "(meth)acryl" encompasses "acryl" and/or "methacryl" (e.g., "(meth)acrylate" encompasses acrylate and/or methacrylate). Further, numerical ranges recited herein are inclusive of their endpoints, unless otherwise specified.

Useful blocked polyisocyanates include polyisocyanates (sometimes referred to in the art as "urethane prepolymers") wherein at least some (e.g., substantially all) of the isocyanate groups have been reacted (i.e., blocked) with a compound (i.e., blocking agent) that forms an adduct with isocyanate groups. Typically, the adduct is substantially unreactive to isocyanate reactive compounds (e.g., amines, alcohols, thiols, etc.) under ambient conditions (e.g., temperatures in a range of from about 20° C. to about 25° C.), but upon application of sufficient thermal energy in the presence of curative, the adduct typically reacts with the curative to form a covalent bond. Procedures and materials for blocking polyisocyanates are well known in the art, and are described, for example, by D. A. Wicks and Z. W. Wicks, Jr. in "Blocked isocyanates III: Part A. Mechanisms and chemistry", Progress in Organic Coatings, vol. 36 (1999), Elsevier Science, New York, pages 148–172; and in "Blocked isocyanates III Part B: Uses and applications of blocked isocyanates", Progress in Organic Coatings, vol. 41 (2001), Elsevier Science, New York, pages 1–83, the disclosures of which are incorporated herein by reference.

Exemplary blocking agents include ketoximes (e.g., 2-butanone oxime); lactams (e.g., epsilon-caprolactam); malonic esters (e.g., dimethyl malonate and diethyl malonate); pyrazoles (e.g., 3,5-dimethylpyrazole); alcohols including tertiary alcohols (e.g., t-butanol or 2,2-dimethylpentanol), phenols (e.g., alkylated phenols), and mixtures of alcohols as described, for example in U.S. Pat. No. 6,288,176 B1 (Hsieh et al.), the disclosure of which is incorporated herein by reference.

Useful polyisocyanates include, for example, aliphatic polyisocyanates (e.g., hexamethylene diisocyanate or trimethylhexamethylene diisocyanate); alicyclic polyisocyanates (e.g., hydrogenated xylylene diisocyanate or isophorone diisocyanate); aromatic polyisocyanates (e.g., tolylene diisocyanate or 4,4'-diphenylmethane diisocyanate); adducts of any of the foregoing polyisocyanates with a polyhydric alcohol (e.g., a diol, low molecular weight hydroxyl group-containing polyester resin, water, etc.); adducts of the foregoing polyisocyanates (e.g., isocyanurates, biurets); and mixtures thereof.

Useful commercially available polyisocyanates include, for example, those available under the trade designation "ADIPRENE" from Uniroyal Chemical Company, Middlebury, Conn. (e.g., "ADIPRENE L 0311", "ADIPRENE L 100", "ADIPRENE L 167", "ADIPRENE L 213", "ADIPRENE L 315", "ADIPRENE L 680", "ADIPRENE LF 1800A", "ADIPRENE LF 600D", "ADIPRENE LFP 1950A", "ADIPRENE LFP 2950A", "ADIPRENE LFP 590D", "ADIPRENE LW 520", and "ADIPRENE PP 1095"); polyisocyanates available under the trade designation "MONDUR" from Bayer Corporation, Pittsburgh, Pa. (e.g., "MONDUR 1437", "MONDUR MP-095", or "MONDUR 448"); and polyisocyanates available under the trade designations "AIRTHANE" and "VERSATHANE" from Air Products and Chemicals, Allentown, Pa. (e.g., "AIRTHANE APC-504", "AIRTHANE PST-95A", "AIRTHANE PST-85A", "AIRTHANE PET-91A", "AIRTHANE PET-75D", "VERSATHANE STE-95A", "VERSATHANE STE-P95", "VERSATHANE STS-55", "VERSATHANE SME-90A", and "VERSATHANE MS-90A").

Exemplary useful commercially available blocked polyisocyanates include those marketed by Uniroyal Chemical Company under the trade designations "ADIPRENE BL 11", "ADIPRENE BL 16", "ADIPRENE BL 31", "ADIPRENE BL 40", "ADIPRENE BL 45", "ADIPRENE BL 46", "ADIPRENE BLM 500", "ADIPRENE BLP 60", or "ADIPRENE BLP 65", and blocked polyisocyanates marketed by Baxenden Chemicals, Ltd., Accrington, England available under the trade designation "TRIXENE" (e.g., "TRIXENE BI 7986", "TRIXENE BI 7985", "TRIXENE BI 7951", "TRIXENE BI 7950", "TRIXENE BI 7960", or "TRIXENE BI 7770").

In some embodiments according to the present invention, the blocked isocyanate may have the formula:

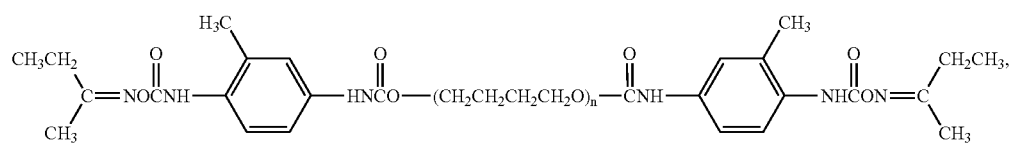

wherein n is an integer greater than or equal to 1, for example, n may be in a range of from 7 to 25, although higher and lower values of n may also be useful. Blocked isocyanates described by this formula include, for example, those marketed under the trade designation "ADIPRENE BL 11", "ADIPRENE BL 16", "ADIPRENE BL 31" by Uniroyal Chemical Company.

Typically, the amount of blocked isocyanate in the oil phase is in a range of from 5 percent by weight to 60 percent by weight, based on the total weight of the oil phase, although other amounts may be used. For example, blocked isocyanate may be present in an amount in a range of from 10 percent by weight to 50 percent by weight, and/or in a range of from about 20 percent by weight to about 40 percent by weight, based on the total weight of the oil phase.

Typically, a curative is a substance containing a plurality of active hydrogen sites, typically at least two active hydrogens such as may be provided by —OH, —NH$_2$, —SH groups, or the like. Useful curatives include, for example, polyamines (e.g., 4,4'-methylenedianiline, 3-aminomethyl-3,5,5-trimethylcyclohexylamine (i.e., isophoronediamine), trimethylene glycol di-p-aminobenzoate, bis(o-aminophenylthio)ethane, and 4,4'-methylenebis(dimethyl anthranilate)), and polyols (e.g., 1,4-butanediol, 1,6-hexanediol, pentaerythritol). Mixtures of polyamines, polyols, and/or mixtures of polyamines with polyols may be useful, for example, to modify reaction rates as required by the intended use.

The curative may comprise an aromatic diamine such as for example bis(4-amino-3-ethylphenyl)methane (marketed under the trade designation "KAYAHARD AA" by Nippon Kayaku Company, Ltd., Tokyo, Japan) or bis(4-amino-3,5-diethylphenyl)methane (marketed under the trade designation "LONZACURE M-DEA" by Lonza, Ltd., Basel, Switzerland). Typically, curative should be present in an amount effective (i.e., an effective amount) to cure the blocked polyisocyanate to the degree required by the intended application; for example, in a stoichiometric ratio of curative to blocked isocyanate in a range of from 0.75 to 1.25 and/or in a range of from 0.85 to 1.15, although stoichiometric ratios outside this range may also be used.

Curable emulsions according to the present invention may contain nonionic surfactant or they may be free of (i.e., contain no) nonionic surfactant. Nonionic surfactant (which may be a single nonionic surfactant or a mixture of nonionic surfactants), if utilized, typically assists in dispersing the oil phase in the aqueous phase. If utilized, nonionic surfactant may be present in either or both of the oil phase and the aqueous phase. For example, nonionic surfactant may be added to the oil phase prior to dispersal in the aqueous phase, yet may be present in both the oil phase and the aqueous phase of the curable emulsion.

Examples of useful nonionic surfactants include condensation products of an organic aliphatic or alkylaryl hydrophobic compound and an alkylene oxide such as ethylene oxide, which is hydrophilic. Typically, almost any hydrophobic compound having a carboxyl, hydroxyl, amido, or amino group with a reactive hydrogen may be condensed with ethylene oxide to form a nonionic surfactant. The length of the ethylene oxide chain of the condensation product may be adjusted to achieve the preferred balance between the hydrophobic and hydrophilic elements (commonly referred to as the Hydrophilic-Lipophilic Balance or HLB value).

The HLB value of a surfactant is an expression of the balance of the size and strength of the hydrophilic and the lipophilic groups of the surfactant. HLB values may be determined, for example, according to the method disclosed by Becher et al. in "The Journal of the American Oil Chemists' Society" (1964), volume 41, pages 169–173, the disclosure of which is incorporated herein by reference. A useful compilation of measured HLB values for a wide variety of nonionic surfactants may be found in, for example, "2001 McCutcheon's Vol. 1: Emulsifiers and Detergents, International Edition" (2001), MC Publishing Company, Glen Rock, N.J., pages 223–232.

Typically, the weight average HLB value of nonionic surfactant utilized in practice of the present invention is in a range of from 10 to 16, although other values may also be used, if they are effective for providing curable emulsions. If more than one nonionic surfactant is used, the individual surfactants may have HLB values lower than 10 or higher than 16; however, the weighted average HLB value of individual nonionic surfactants, taken collectively, is typically in a range of from 10 to 16, for example, in a range of from 12 to 14. The weighted average HLB value is calculated by summing, for each nonionic surfactant utilized, the HLB value of that nonionic surfactant divided by the weight fraction of that nonionic surfactant to the total nonionic surfactant utilized. Thus, if a single nonionic surfactant is utilized, the weight average HLB value is simply the HLB value of that surfactant.

Examples of useful commercially available nonionic surfactants include condensation products of a higher aliphatic alcohol with about 3 equivalents to about 100 equivalents of ethylene oxide (e.g., those marketed by Dow Chemical Company, Midland, Mich. under the trade designation "TERGITOL 15-S" such as for example, "TERGITOL 15-S-20"; and those marketed by ICI Americas, Bridgewater, N.J. under the trade designation "BRIJ" such as, for example, "BRIJ 56" and "BRIJ 76"); polyethylene oxide condensates of an alkyl phenol with about 3 equivalents to about 100 equivalents of ethylene oxide (e.g., those marketed by Rhodia, Cranbury, N.J. under the trade designations "IGEPAL CO" and "IGEPAL CA"); block copolymers of ethylene oxide and propylene oxide or butylene oxide (e.g., those marketed by BASF Corporation, Mount Olive, N.J. under the trade designations "PLURONIC" and "TETRONIC"); sorbitan fatty acid esters, polyoxyethylene sorbitan fatty acid esters (e.g., polyoxyethylene sorbitan monooleates, which may have differing degrees of ethoxylation such as, for example, 20 ethylene oxide units per molecule (e.g., marketed under the trade designation "TWEEN 60") or 20 ethylene oxide units per molecule (e.g., marketed under the trade designation "TWEEN 80")) and polyoxyethylene stearates (e.g., those marketed under the trade designations "SPAN", "TWEEN", and "MYRJ" by Uniqema, New Castle, Del.).

Typically, the amount of nonionic surfactant utilized, if utilized, is in an amount of less than about 5 percent by weight (e.g., less than 2 percent by weight, less than 1.5 percent by weight). For example, nonionic surfactant may be present in an amount in a range of from 0.7 percent by weight to 2 percent by weight, or a range of from 0.8 percent by weight to 1.5 percent by weight, based on the total weight of the oil phase.

The aqueous phase comprises water and at least partially neutralized crosslinked copolymer of monomers comprising at least one free-radically polymerizable carboxylic acid and at least one of an alkyl or alkaryl (meth)acrylate, wherein the at least one alkyl or alkaryl (meth)acrylate has from 11 carbon atoms to 34 carbon atoms, and optionally additional co-monomers. As used herein, the term "carboxylic acid" encompasses the corresponding conjugate base (i.e., carboxylate).

Useful free-radically polymerizable carboxylic acids have at least one carboxyl group covalently bonded to a polymerizable carbon-carbon double bond. Exemplary free-radically polymerizable carboxylic acids include itaconic acid, (meth)acrylic acid, maleic acid, fumaric acid, salts of the foregoing, and mixtures thereof. The phrase "copolymer of monomers comprising" refers to the structure of the copolymer rather than any particular method of preparing the copolymer. For example, the copolymer may be prepared using a monomer (e.g., maleic anhydride) that on hydrolysis (before or after co-polymerization) results in a free-radically polymerizable carboxylic acid. In order to ensure good swellability of the crosslinked copolymer, the acid content typically falls in a range of from about 40 percent to about 90 percent by weight (e.g., in a range of from 50 to 70 percent by weight) of the crosslinked copolymer, although acid content values outside this range may also by used.

Useful alkyl and alkaryl (meth)acrylates have from 11 carbon atoms to 34 carbon atoms, and may be linear or branched. Examples of useful alkyl and alkaryl (meth) acrylates include octyl (meth)acrylate, isooctyl (meth)acrylate, octadecyl (meth)acrylate, tridecyl (meth)acrylate, and nonylphenyl acrylate.

Optionally, additional co-monomers (e.g., (meth)acrylamide, butyl (meth)acrylate) may be included in the crosslinked copolymer.

Crosslinking is typically accomplished by inclusion of a monomer having multiple free-radically polymerizable groups (i.e., polyfunctional monomer) in the monomer mixture prior to copolymerization, although other methods may be used. Useful polyfunctional monomers are well known and include, for example, vinyl ethers (e.g., pentaerythritol trivinyl ether, pentaerythritol tetravinyl ether, ethylene glycol divinyl ether), allyl ethers (e.g., pentaerythritol triallyl ether, pentaerythritol tetraallyl ether, ethylene glycol diallyl ether), and acrylates (e.g., 1,6-hexanediol diacrylate), and mixtures thereof. The amount of crosslinking desired typically determines the amount of polyfunctional monomer used. In order to ensure good swellability with water, the crosslink density should typically be kept at low level; for example, the value of $M_C$ (i.e., the average molecular weight of segments between crosslinks) may be greater than 1000 g/mole, greater than 2000 g/mole, and/or greater than 3000 g/mole.

Examples of useful commercially available crosslinked copolymers include, for example, those marketed by Noveon, Cleveland, Ohio under the trade designations "CARBOPOL" and "PEMULEN" (e.g., "CARBOPOL 674 POLYMER", "CARBOPOL 676 POLYMER", "CARBOPOL 934 POLYMER", "CARBOPOL 940 POLYMER", "CARBOPOL 941 POLYMER", "CARBOPOL 980 POLYMER", "CARBOPOL 981 POLYMER", "CARBOPOL 1342 POLYMER", "CARBOPOL 1610 POLYMER", "PEMULEN 1621 RESIN", "PEMULEN 1622 RESIN", "CARBOPOL 1623 POLYMER", "CARBOPOL 2984 POLYMER", and "CARBOPOL 5984 POLYMER").

Typically, the crosslinked copolymer should be provided in a form (e.g., as particles) that is readily dispersible and water-swellable. These criteria are typically achieved by crosslinked copolymers having an average dry (i.e., non-swelled) particle size in a range of from about 0.1 micrometer to about 10 micrometers, or in a range of from about 2 micrometers to about 7 micrometers, although larger and smaller particles may also be used.

Typically, the crosslinked copolymer is present in the aqueous phase in an amount in a range of from about 0.01 percent by weight to about 1 percent by weight, based on the total weight of the emulsion, although higher and lower amounts may also be used. For example, the crosslinked copolymer may be present in an amount in a range of from 0.1 percent by weight to 0.6 percent by weight, and/or in a range of from 0.2 percent by weight to 0.4 percent by weight, based on the total weight of the curable emulsion.

Methods for preparing the aqueous phase are well known and include, for example, addition (e.g., by sifting) of finely powdered crosslinked copolymer to water with agitation, or dilution of a concentrated solution of the crosslinked copolymer in water. Agitation may typically be accomplished, for example, using a motorized mixer having a conventional open blade impeller (pitched marine or saw tooth propeller) and operating at a speed of in a range of about 800 revolutions per minute to about 1200 revolutions per minute. Extremely high-shear mixers such as blenders or rotor-stator homogenizers may shear the opened (hydrated) crosslinked copolymer resulting in permanent viscosity loss and are preferably not used as the means of agitation. In another commonly used method, the crosslinked copolymer may typically be dispersed in water at concentrations of up to about 4 percent by weight using an eductor or flocculant disperser.

To enhance stability of the curable emulsion with respect to coalescence of the oil phase, the pH of the aqueous phase is typically adjusted by addition of a neutralizing agent to achieve a value in a range of from about 5 to about 10, although values outside this range may also be useful. For example, the pH of the aqueous phase may be in a range of from 4 to 10, in a range of from 4 to 7, or in a range of from 6.5 to 7. Suitable neutralizing agents are well known and include, for example, inorganic bases (e.g., an alkali metal hydroxide, ammonium hydroxide) and organic basic compounds (e.g., an amine). Preferably, the neutralizing agent comprises an amine. Exemplary amines include N,N-dimethyl-2-aminoethanol, and triethanolamine.

In order to ensure complete wet out of the crosslinked copolymer, the neutralizing agent is preferably added after complete hydration of the crosslinked copolymer, although partial or complete adjustment of the pH may be done prior to addition of the crosslinked copolymer.

Optionally, at least one of the aqueous and/or the oil phase may further comprise at least one organic solvent and/or volatile organic compound. For example, a volatile organic compound (i.e., a compound having a vapor pressure of greater than 2 torr (0.27 kPa) at 25° C.). Exemplary classes of organic solvents and/or volatile organic compounds include alkanes, alcohols, ketones, esters, and ethers. For some applications (e.g., those applications in which control of volatile organic compound emissions is desired) curable emulsions according to the present invention may be substantially free (i.e., contain less than 10 percent by weight) of at least one organic solvent and/or volatile organic compound. For example, in some embodiments, curable emulsions according to the present invention may have less than 1 percent by weight of at least one organic solvent and/or volatile organic compound.

Typically, the weight ratio of oil phase to aqueous phase is in a range of from about 1:10 to about 7:3, although weight ratios outside this range may also be used. For example, the weight ratio of oil phase to aqueous phase may be in a range of from about 40:60 to about 65:35, and/or in a range of from about 60:40 to about 55:45.

Curable emulsions according to the present invention may optionally include (typically within the oil phase) at least one, optionally curable, additional polymer or polymer precursor. Exemplary optional additional polymers and/or polymer precursors include phenolic resins, urea-formaldehyde resins, melamine-formaldehyde resins, urethane resins, acrylate resins, polyester resins, aminoplast resins having pendant alpha,beta-unsaturated carbonyl groups, epoxy resins, acrylated urethanes, acrylated epoxies, and combinations thereof.

Optionally, curable emulsions may also be mixed with and/or include one or more additives in either or both of the aqueous and/or oil phases. Exemplary additives include fillers, coupling agents, plasticizers, lubricants, colorants (e.g., pigments), bactericides, fungicides, grinding aids, and antistatic agents.

In some embodiments according to the present invention, curable emulsions are free of added filler and/or grinding aid. Such curable emulsions may be useful, for example, for preparing abrasive articles that exhibit abrasive properties comparable to commercially available abrasive articles with binders that include fillers and/or grinding aids. As used herein, the term "free of added filler and/or grinding aid" means that such materials are either wholly absent or present in sufficiently small amounts that they do not exhibit a change of more than five percent in mechanical or abrasive properties of the cured emulsion.

Curable emulsions according to the present invention may be prepared, for example, by heating, individually or as any combination thereof, blocked polyisocyanate, curative, and optional nonionic surfactant to a temperature in a range of from about 50° C. to about 70° C., and combining them to form a premix. The exact temperature is not critical as long as the combination of blocked polyisocyanate curative and nonionic surfactant forms a reasonably uniform mixture. If using low viscosity components, the curable emulsion may be prepared without heating, although heating may be used.

The aqueous phase may be prepared, for example, by sequentially dispersing the crosslinked copolymer in cold water (e.g., in a range of from 15° C. to 25° C.), and then heating the dispersion to a temperature in a range of from about 50° C. to about 70° C., and then adding sufficient neutralizing agent to achieve the intended pH as described above.

The premix may then be added to the neutralized aqueous phase with stirring, typically forming an oil-in-water emulsion with blocked polyisocyanate, curative, and nonionic surfactant contained within, or associated with, the oil phase.

Typically, abrasive particles and/or optional additive(s) may be added to the premix, the aqueous phase, or to the curable emulsion.

Curable emulsions according to the invention may be applied to a substrate by any method known for applying an emulsion including spraying, roll coating, gravure coating, dip coating, curtain coating, die coating, and the like.

Once applied to a substrate, the curable emulsions according to the present invention are typically at least partially dried to remove water and optional organic solvent and coalesce the oil phase. Drying may be accomplished, for example, by evaporation, preferably at elevated temperature (i.e., above ambient temperature, for example, in a range of from about 50° C. to about 120° C.). After sufficient water and optional organic solvent has been removed to coalesce the oil phase, preferably substantially all of the water and optional organic solvent, the remaining components are typically at least partially cured by application of thermal energy (e.g., at a temperature greater than about 120° C., although other curing temperatures may be utilized). Typically, drying and curing may be performed sequentially, or as a single process step. Exemplary useful sources of thermal energy includes ovens, heated rolls, and/or infrared lamps. If desired, further application of thermal energy (e.g., by heating to a higher temperature) may also be desirable to improve binder properties.

Curable emulsions according to the present invention may be used to prepare protective coatings, binders (e.g., for nonwoven articles), and the like. Further, curable emulsions according to the present invention may be used to prepare abrasive articles such as, for example, coated abrasive articles, nonwoven abrasive articles, bonded abrasive articles, and/or abrasive brushes.

In general, coated abrasive articles have abrasive particles secured to a backing. More typically, coated abrasive articles comprise a backing having two major opposed surfaces and an abrasive coat secured to a major surface. The abrasive coat is typically comprised of abrasive particles and a binder, wherein the binder serves to secure the abrasive particles to the backing.

Suitable abrasive particles include any abrasive particles known in the abrasive art. Exemplary useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and blends thereof. Preferably, the abrasive particles comprise fused aluminum oxide, heat-treated aluminum oxide, ceramic aluminum oxide, silicon carbide, alumina zirconia, garnet, diamond, cubic boron nitride, sol-gel derived abrasive particles, or mixtures thereof.

The abrasive particles may be in the form of, for example, individual particles, abrasive composite particles, agglomerates (including erodible agglomerates), and mixtures thereof (e.g., having the same or different size and/or composition).

The abrasive particles typically have an average diameter of from about 0.1 micrometer to about 2000 micrometers, more preferably from about 1 micrometer to about 1300 micrometers, although other particles having other diameters can be used.

Coating weights for the abrasive particles may depend on, for example, the type of abrasive article (e.g., coated abrasive article or nonwoven abrasive article), the process for applying the abrasive particles, and the size of the abrasive particles, but typically range from about 5 grams per square meter ($g/m^2$) to about 1350 $g/m^2$.

In one exemplary embodiment of a coated abrasive article, the abrasive coat may comprise a make coat, a size coat, and abrasive particles. Referring to FIG. 1, an exemplary coated abrasive article 100 has backing 120 and abrasive coat 130 according to the present invention. Abrasive coat 130, in turn, includes abrasive particles 140 secured to major surface 170 of backing 120 by make coat 150 and size coat 160.

In making such a coated abrasive article, a make coat comprising a first binder precursor is applied to a major surface of the backing. Abrasive particles are then at least partially embedded into the make coat (e.g., by electrostatic coating), and the first binder precursor is at least partially cured to secure the particles to the make coat. A size coat comprising a second binder precursor (which may be the same or different from the first binder precursor) is then applied over the make coat and abrasive particles, followed by curing the binder precursors.

Optionally, coated abrasive articles may further comprise, for example, a backsize (i.e., a coating on the major surface of the backing opposite the major surface having the abrasive coat), a presize or a tie layer (i.e., a coating between the abrasive coat and the major surface to which the abrasive coat is secured), and/or a saturant which coats both major surfaces of the backing. Coated abrasive articles may further comprise a supersize covering at least a portion of the abrasive coat. If present, the supersize typically includes grinding aids and/or anti-loading materials.

Figure 2:
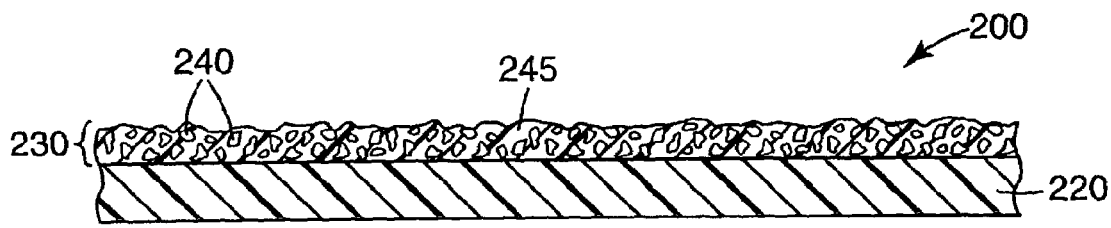

In another exemplary embodiment of a coated abrasive article according to the present invention, the abrasive coat may comprise a cured slurry of a binder precursor and abrasive particles. Referring to FIG. 2, exemplary coated abrasive article 200 has backing 220 and abrasive coat 230. Abrasive coat 230, in turn, includes abrasive particles 240 and binder 245 according to the present invention.

In making such a coated abrasive article, a slurry comprising a first binder precursor and abrasive particles is typically applied to a major surface of the backing, and the binder precursor is then at least partially cured. Curable emulsions according to the present invention may be included in binder precursors used to prepare one or more of the abovementioned layers and coatings of coated abrasive articles.

Coated abrasive articles according to the present invention may be converted, for example, into belts, rolls, discs (including perforated discs), and/or sheets. For belt applications, two free ends of the abrasive sheet may be joined together using known methods to form a spliced belt.

Further description of techniques and materials for making coated abrasive articles may be found in, for example, U.S. Pat. No. 4,314,827 (Leitheiser et al.); U.S. Pat. No. 4,518,397 (Leitheiser et al.); U.S. Pat. No. 4,588,419 (Caul et al.); U.S. Pat. No. 4,623,364 (Cottringer et al.); U.S. Pat. No. 4,652,275 (Bloecher et al.); U.S. Pat. No. 4,734,104 (Broberg); U.S. Pat. No. 4,737,163 (Larkey); U.S. Pat. No. 4,744,802 (Schwabel); U.S. Pat. No. 4,751,137 (Tumey et al.); U.S. Pat. No. 4,770,671 (Monroe et al.); U.S. Pat. No. 4,799,939 (Bloecher et al.); U.S. Pat. No. 4,881,951 (Wood et al.); U.S. Pat. No. 4,927,431 (Buchanan et al.); U.S. Pat. No. 5,498,269 (Larmie); U.S. Pat. No. 5,011,508 (Wald et al.); U.S. Pat. No. 5,078,753 (Broberg et al.); U.S. Pat. No. 5,090,968 (Pellow); U.S. Pat. No. 5,108,463 (Buchanan et al.); U.S. Pat. No. 5,137,542 (Buchanan et al.); U.S. Pat. No. 5,139,978 (Wood); U.S. Pat. No. 5,152,917 (Pieper et al.); U.S. Pat. No. 5,201,916 (Berg et al.); U.S. Pat. No. 5,203,884 (Buchanan et al.); U.S. Pat. No. 5,227,104 (Bauer); U.S. Pat. No. 5,328,716 (Buchanan); U.S. Pat. No. 5,366,523 (Rowenhorst et al.); U.S. Pat. No. 5,378,251 (Culler et al.); U.S. Pat. No. 5,417,726 (Stout et al.); U.S. Pat. No. 5,429,647 (Larmie); U.S. Pat. No. 5,436,063 (Follett et al.); U.S. Pat. No. 5,490,878 (Peterson et al.); U.S. Pat. No. 5,492,550 (Krishnan et al.); U.S. Pat. No. 5,496,386 (Broberg et al.); U.S. Pat. No. 5,520,711 (Helmin); U.S. Pat. No. 5,549,962 (Holmes et al.); U.S. Pat. No. 5,551,963 (Larmie); U.S. Pat. No. 5,556,437 (Lee et al.); U.S. Pat. No. 5,560,753 (Buchanan et al.); U.S. Pat. No. 5,573,619 (Benedict et al.); U.S. Pat. No. 5,609,706 (Benedict et al.); U.S. Pat. No. 5,672,186 (Chesley et al.); U.S. Pat. No. 5,700,302 (Stoetzel et al.); U.S. Pat. No. 5,942,015 (Culler et al.); U.S. Pat. No. 5,954,844 (Law et al.); U.S. Pat. No. 5,961,674 (Gagliardi et al.); U.S. Pat. No. 5,975,988 (Christianson); U.S. Pat. No. 6,059,850 (Lise et al.); and U.S. Pat. No. 6,261,682 (Law), the disclosures of which are incorporated herein by reference.

Figure 3A:
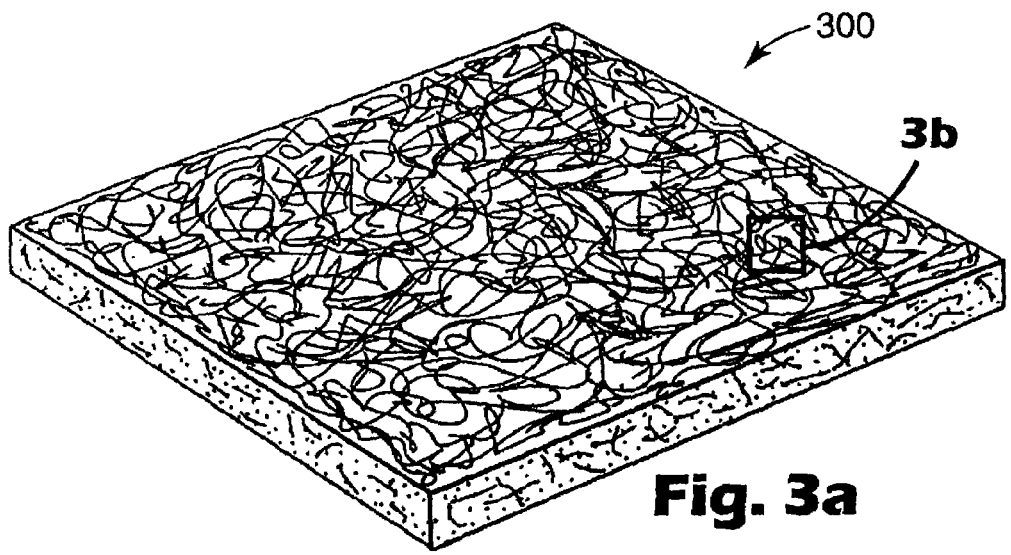
FIG. 3a is a perspective view of an exemplary nonwoven abrasive article according to the present invention.
Figure 3B:
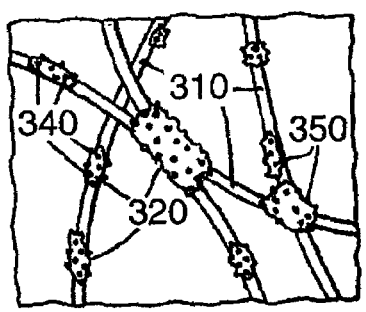

Nonwoven abrasive articles typically include a porous (e.g., a lofty open porous) polymer filament structure having abrasive particles bonded thereto by a binder. An exemplary embodiment of a nonwoven abrasive article according to the present invention is shown in FIGS. 3a and 3b, wherein lofty open low-density fibrous web 300 is formed of entangled filaments 310 impregnated with binder 320 according to the present invention. Abrasive particles 340 are dispersed throughout fibrous web 300 on exposed surfaces of filaments 310. Binder resin 320 uniformly coats portions of filaments 310 and forms globules 350 which may encircle individual filaments or bundles of filaments, adhere to the surface of the filament and/or collect at the intersection of contacting filaments, providing abrasive sites throughout the nonwoven abrasive article.

The fiber web may comprise continuous filaments (e.g., a spunbond fiber web) and/or staple fibers that may be crimped and/or entangled with one another. Exemplary fibers include polyester fibers, polyamide fibers, and polyaramid fibers.

The fiber web may, optionally, be affixed (i.e., secured) to a backing, for example, by needletacking, stitchbonding, and/or adhesive bonding (e.g., using glue or a hot melt adhesive).

Binders and binder precursors (including curable emulsions according to the present invention), backings, abrasive particles, optional additives, and optional layers set forth hereinabove for inclusion in coated abrasive articles may also be utilized in nonwoven abrasives according to the present invention.

Nonwoven abrasive articles according to the invention may be converted to a variety of useful forms including, for example, sheets, discs, belts, rolls, wheels, hand pads, cleaning brushes, and blocks.

Further description of techniques and materials for making nonwoven abrasive articles may be found in, for example, U.S. Pat. No. 2,958,593 (Hoover et al.); U.S. Pat. No. 4,018,575 (Davis et al.); U.S. Pat. No. 4,227,350 (Fitzer); U.S. Pat. No. 4,331,453 (Dau et al.); U.S. Pat. No. 4,609,380 (Barnett et al.); U.S. Pat. No. 4,991,362 (Heyer et al.); U.S. Pat. No. 5,554,068 (Carr et al.); U.S. Pat. No. 5,712,210 (Windisch et al.); U.S. Pat. No. 5,591,239 (Edblom et al.); U.S. Pat. No. 5,681,361 (Sanders); U.S. Pat. No. 5,858,140 (Berger et al.); U.S. Pat. No. 5,928,070 (Lux); U.S. Pat. No. 6,017,831 (Beardsley et al.); U.S. Pat. No. 6,207,246 (Moren et al.); and U.S. Pat. No. 6,302,930 (Lux), the disclosures of which are incorporated herein by reference.

Figure 4:
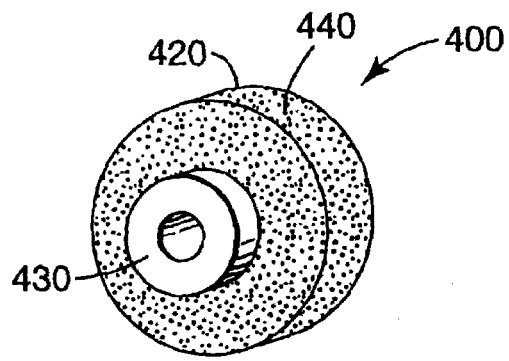
FIG. 4 is a perspective view of an exemplary bonded abrasive article according to the present invention.

Bonded abrasive articles typically include a shaped mass of abrasive particles held together by a binder. Referring now to FIG. 4, an exemplary embodiment of a bonded abrasive article according to the present invention has the form of grinding wheel 400, wherein abrasive particles 440 are held together by binder 420 according to the present invention to form a shaped mass mounted on hub 430.

In one method, bonded abrasive articles may be formed by preparing a mixture of abrasive particles in a binder precursor, shaping the mixture (e.g., using a mold), and curing the binder precursor to form a binder. In one embodiment according to the present invention (e.g., a vitreous bonded abrasive article), the binder may be subsequently removed by pyrolysis.

Bonded abrasive articles according to the present invention may have any form useful as an abrasive article such as, for example, a wheel (e.g., grinding wheel, polishing wheel, cutoff wheel), a honing stone, a belt, mounted points, or other conventional bonded abrasive shape.

Further details regarding bonded abrasive articles may be found in, for example, U.S. Pat. No. 4,800,685 (Haynes et al.); U.S. Pat. No. 4,898,597 (Hay et al.); U.S. Pat. No. 4,933,373 (Moren); U.S. Pat. No. 5,282,875 (Wood et al.), the disclosures of which are incorporated herein by reference.

Curable emulsions according to the present invention are also useful as binder precursors for the preparation of abrasive brushes such as flap brushes as described, for example, in U.S. Pat. No. 5,554,068 (Carr et al.), and unitary brushes as described, for example, in U.S. Pat. Publication 2002/0065031A1 (Chou et al.), published May 30, 2002, the disclosures of which are incorporated herein by reference.

Figure 5:
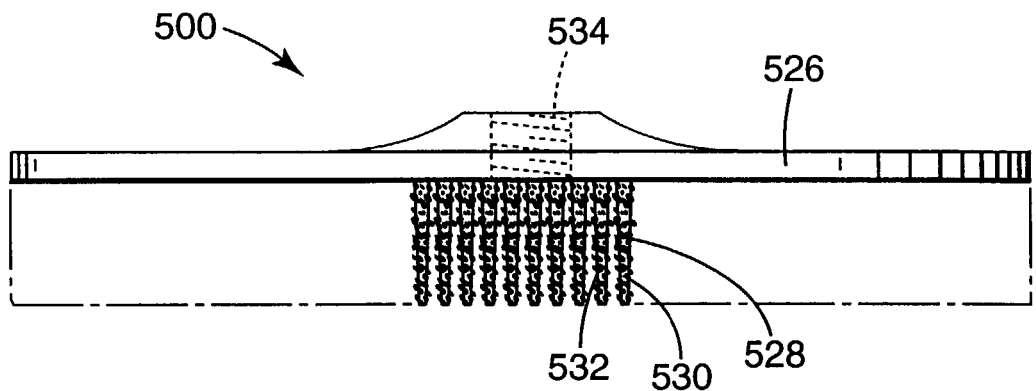
FIG. 5 is a side view of an exemplary unitary brush according to the present invention.

One exemplary embodiment of a unitary brush according to the present invention is illustrated in FIG. 5. Referring to FIG. 5, cup brush 500 has base 526 and bristles 528 attached at a right angle to base 526. Abrasive particles 530 are adhered to bristles 528 via binder 532 according to the present invention. Base 526 has hole 534 in the center thereof, which is threaded, for example, to allow for easy attachment to a rotary hand tool.

Figure 6:
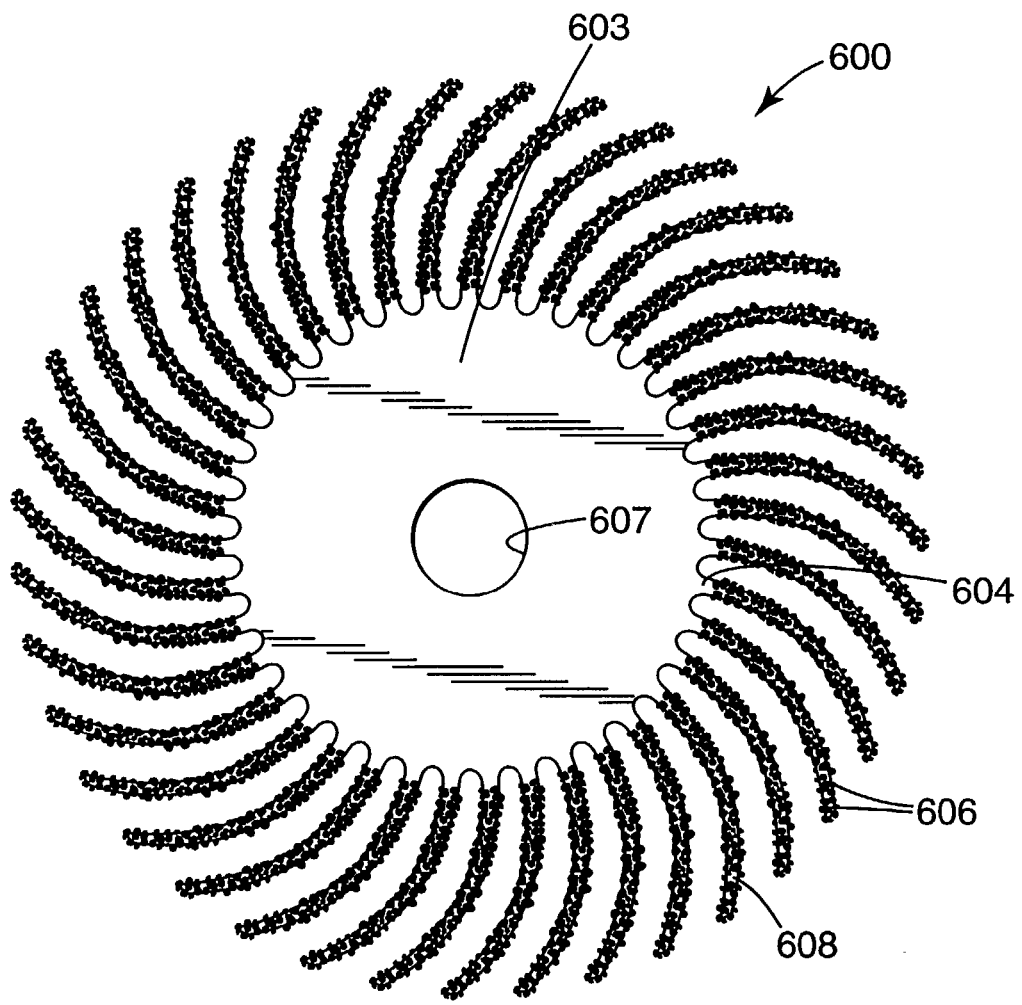
FIG. 6 is a front plan view of another exemplary unitary brush according to the present invention.

Another exemplary embodiment of a unitary brush according to the present invention is illustrated in FIG. 6. Referring to FIG. 6, radial brush 600 has central hub base 603 having bristles 604 extending outwardly therefrom. Central hub 603 has hole 607 in the center thereof. Bristles 604 have abrasive particles 606 adhered thereto via binder 608 according to the present invention. Radial brushes according to the present invention may be used individually or ganged together.

To enhance the life of unitary brushes, binders according to the present invention that are in contact with bristles may have a flexural modulus, as measured according to ASTM Test Method D790-02 "Standard Test Methods for Flexural Properties of Unreinforced and Reinforced Plastics and Electrical Insulating Materials" (2002), that is similar to (e.g., within 20 percent of) the flexural modulus of the bristles.

Curable emulsions according to the present invention may be foamed and used to prepare foraminous abrasive articles as described in, for example, U.S. Pat. No. 6,007,590 (Sanders), the disclosure of which is incorporated herein by reference.

Abrasive articles according to the present invention are useful for abrading a workpiece. Methods for abrading with abrasive articles according to the present invention range from snagging (i.e., high pressure high stock removal) to polishing (e.g., polishing medical implants with coated abrasive belts), wherein the latter is typically done with finer grades (e.g., less ANSI 220 and finer) of abrasive particles.

One such method includes the step of frictionally contacting an abrasive article (e.g., a coated abrasive article, a non-woven abrasive article, or a bonded abrasive article) with a surface of the workpiece, and moving at least one of the abrasive article or the workpiece relative to the other to abrade at least a portion of the surface.

Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades. The applied force during abrading typically ranges from about 1 kilogram to about 100 kilograms.

Abrasive articles according to the present invention may be used by hand and/or used in combination with a machine. At least one of the abrasive article and the workpiece is moved relative to the other when abrading.

Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, and/or the like.

The present invention will be more fully understood with reference to the following non-limiting examples in which all parts, percentages, ratios, and so forth, are by weight unless otherwise indicated.

EXAMPLES

Unless otherwise noted, all reagents used in the examples were obtained, or are available from, general chemical suppliers such as Aldrich Chemical Company, Milwaukee, Wis., or may be synthesized by known methods.

The following abbreviations are used throughout the Examples:

| | |
|---|---|
| PU1 | Ketoxime-blocked poly(1,4-butylene glycol) diisocyanate, 100% solids commercially available under the trade designation "ADIPRENE BL-16" from Crompton & Knowles Corporation, Stamford, Connecticut |
| PU2 | Ketoxime-blocked poly(1,4-butylene glycol) diisocyanate, 85% solids in propylene glycol monomethyl ether acetate commercially available under the trade designation "ADIPRENE BL-31" from Crompton & Knowles Corporation |
| PU3 | Ketoxime-blocked poly(1,4-butylene glycol) diisocyanate, 100% solids commercially available under the trade designation "ADIPRENE BL-11" from Crompton & Knowles Corporation |
| C1 | A solution of 35 parts 4,4'-methylenedianiline in 65 parts ethylene glycol monoethyl ether acetate |
| C2 | Bis(4-amino-3,5-diethylphenyl)methane commercially available under the trade designation "LONZACURE M-DEA" from Lonza AG, Werke, Switzerland |
| S1 | Ethoxylated sorbitan ester commercially available under the trade designation "TWEEN 80" from Uniqema, New Castle, Delaware |
| S2 | Ethoxylated sorbitan ester commercially available under the trade designation "TWEEN 81" from Uniqema |
| PAA 1 | Crosslinked copolymer of acrylic acid and long chain ($C_{10}$–$C_{30}$) alkyl acrylates commercially available under the trade designation "PEMULEN 1622" from Noveon, Cleveland, Ohio |
| PAA 2 | Crosslinked copolymer of acrylic acid and long chain ($C_{10}$–$C_{30}$) alkyl acrylates commercially available under the trade designation "PEMULEN 1621" from Noveon, Cleveland, Ohio |

-continued

| | |
|---|---|
| Pigment | Blue pigment dispersed in epoxy resin obtained under the trade designation "PDI Type 22" from Ferro Corporation, Edison, New Jersey |
| Solvent 1 | Propylene glycol monomethyl ether acetate obtained under the trade designation "ARCOSOLV PM ACETATE" from Arco Chemical Company, Houston, Texas |
| Solvent 2 | Xylene, ten degree from Ashland Chemical Company, Cranbury, New Jersey |
| Particle Board | 45 lb/ft$^3$ (720 kg/m$^3$) 5/8-inch thick particleboard obtained under the trade designation "KORPINE" from Willamette Industries, Weyerhaeuser Company, Federal Way, Washington |
| Bentonite | Bentonite clay obtained under the trade designation "VOLCAY 325" from American Colloid Company, Arlington Heights, Illinois |
| Lampblack | Carbon black pigment obtained under the trade designation "RAVEN 16" from Columbian Chemical Company, St. Louis, Missouri |
| Fumed Silica | Silicon dioxide obtained under the trade designation "CAB-O-SIL UNTREATED FUMED SILICA M5" from Cabot Corporation, Tuscola, Illinois |
| Silane | Glycidoxypropyl trimethoxysilane coupling agent (>60 percent by weight purity) obtained under the trade designation "Z-6040 SILANE" from Dow-Corning Corporation, Midland, Michigan |
| LiSt | Lithium stearate obtained under the trade designation "LITHIUM STEARATE 306" obtained from Witco Chemical Corporation, Perth Amboy, New Jersey, prepared and used at 44 percent by weight solids in propylene glycol monomethyl ether acetate |
| NH$_4$OH | 28 percent by weight aqueous ammonium hydroxide |

General Method of Emulsion Preparation

Emulsions were prepared by combining the specified amounts of components in the following order:
1. An oil phase was prepared by combining, with stirring, warm (i.e., about 50° C.) diisocyanate prepolymer, liquid curative (melted at about 87–89° C. in the case of C2), and nonionic surfactant;
2. A premix was prepared by dissolving the poly(acrylic acid-co-alkyl acrylate) in water in an amount of 4 percent by weight;
3. An aqueous phase was prepared by combining the premix with a neutralizing agent in warm water; and
4. The warm oil phase was added to the warm aqueous phase with sufficient stirring (700 to 1200 rpm, 2-inch (5 cm) stirring blade) to form the emulsion.

Wear Test

Three discs having a center cut out (10-inch (25.4 mm) outer diameter, 2-inch (5.1 mm) inner diameter) of the nonwoven abrasive to be tested, were mounted, separated from each other by 12.7 mm thick 15.2 cm×5.08 cm steel spacers, on a 2-inch (5.1 mm) spindle between two 7.6 cm diameter holding flanges to produce a disc stack having a cylindrical abrasive surface. The flanges were tightened sufficiently to ensure that the discs would not rotate on the spindle during the test.

The workpiece to be abraded was a screen coupon of a 1.5 mm thick cold rolled steel sheet having a hexagonal close packed array of 4 mm diameter holes spaced 5.5 mm apart (center to center) obtained from Harrington & King Perforating Company, Chicago, Ill. (Part Number FX001308).

The disc stack was rotated on a rotating shaft at a rate of 2,300 rpm with a loading of 9.08 kg between it and the workpiece for duration of two minutes. As the disc assembly was rotated, the workpiece was oscillated 13.9 cm in a vertical direction in 12-second cycles. The workpiece was replaced after each minute. The total weight of each workpiece and the abrasive discs was measured before, and after, abrading the coupon. The amount of material removed from the workpiece was recorded as "Cut" and the combined weight loss of the three abrasive discs was recorded as "Wear". The entire test was repeated two additional times and the average values reported.

Tensile Test

Tensile properties were evaluated according to ASTM Test Method D 638-02 (2002), "Standard Test Method for Tensile Properties of Plastics", the disclosure of which is incorporated herein by reference, and which gives a comprehensive listing of tensile properties, testing procedures, and property calculations. Five dumbbell-shaped specimens of dimensions W=0.125 inch (3.8 mm)×LO=2.062 inches (52.4 mm)×WO=0.562 inch (14.3 mm) were die-cut from each film sample, where W is the width of the narrow section of the dumbbell, LO is the overall length of the specimen, and WO is the overall length of the specimen. Each dumbbell was clamped into a constant rate of extension tensile testing machine having the trade designation "SINTECH 2" and equipped with a 200-pound (91 kg) load cell available from MTS Systems Corporation, Cary, N.C. Data acquisition, tensile property calculations, and machine control was performed using software available from MTS Systems Corporation, Cary, N.C. under the trade designation "TESTWORKS VERSION 2.1". The gage length was 1.0 inch (2.54 cm), the strain rate was set to 1.0 inch/minute (2.54 cm/min), and the specimen gripping surface was serrated and 2 inches (5 cm) wide×1.5 inches (3.8 cm) long. Test results reported are the statistical average of 10 measurements of a single film.

Friction Test

Coefficients of friction were determined using a Thwing-Albert Friction/Peel Tester Model No. 225-1 (Thwing-Albert Instrument Company, Philadelphia, Pa.) that was equipped with a 2000-gram load cell and a variable temperature platen cooled to 15° C.). Measurements were made by pulling a steel bar weighing 500 grams (g) and having a 2 inches×2 inches (5.1 cm×5.1 cm) sliding contact face across a film specimen at 2.1 inches/minute (5.6 cm/min). Three measurements each of coefficient of static friction and coefficient of kinetic friction were made for each specimen and reported as an average value.

General Method for Film Preparation—Tensile Test

Film specimens for subsequent tensile testing were prepared via a spin-casting procedure. Twenty-five mL of the formulation to be cast was delivered onto the interior surface of a 3.0 inches (7.6 cm) inner diameter×3.0 inches (7.6 cm) long poly(tetrafluoroethylene)-lined aluminum cylinder provided with a detachable annular 2.5 inches (6.4 cm) inner diameter×3.0 inches (7.6 cm) outer diameter lip. The cylinder was then rotated axially at 3600 rpm via an attached electric motor. Heated air from a hot air gun was directed at the rotating cylinder to maintain the surface of the resin at 250–260° F. (121–127° C.) as measured by an optical pyrometer (obtained under the trade designation "IR 750" from 3M Company, Saint Paul, Minn.) for four hours. The rotation and heating were then stopped and the resulting cylindrical film allowed to cool while in place in the apparatus. The lip was then removed and the cast cylindrical film specimen was removed from the apparatus. The cylindrical film specimen was then cut lengthwise to provide a 9.4 cm×7.6 cm rectangular sheet. Typical film thickness was 0.025–0.030 inch (0.64–0.76 mm). The rectangular sheet was placed in a forced air oven and post-cured in a forced air convection oven set at 250° F. (121° C.) for 18 hours. Upon cooling to ambient conditions, the film was prepared for testing.

General Method for Film Preparation—Friction Test

Films for subsequent friction testing were prepared on steel plates (phosphate coated, 4 inches×12 inches×0.030 inch (10.1×30.5 cm×0.76 mm)). Each film was prepared by knife coating the specified composition at a wet thickness of 0.010 inch (0.25 mm), allowing it to air dry for 2 hours, and then placing it in a convection oven at 250° F. (121° C.) for 18 hours. Each film was then allowed to cool to room temperature prior to friction measurements at various temperatures.

Comparative Examples A–D

Comparative Examples A–D were prepared by combining components in the amounts indicated in Table 1. The urethane resin, curative, and additional solvent (if used) were combined with stirring until completely dissolved, then nonionic surfactant, if used, was added with stirring.

Examples 1–3

Examples 1–3 were prepared according to the General Method of Emulsion Preparation. The oil phase was prepared by combining components in the amounts indicated in Table 1 (below). The PU1 and melted C2 were combined with stirring until completely dissolved, and then nonionic surfactant (if used) was added with stirring. The aqueous phase was prepared by combining 170 parts water, 30 parts of a 2 percent by weight solution of polyacrylic acid in water, and 1 part of NH₄OH. The oil phase and aqueous phase were combined yielding an emulsion.

TABLE 1

| | Component, parts | | | | | |
|---|---|---|---|---|---|---|
| EXAMPLE | PU1 | S1 | S2 | C1 | C2 | Solvent 1 |
| Comparative Example A | 72.4 | 0 | 0 | 25.0 | 0 | 0 |
| Comparative Example B | 105.2 | 0 | 0 | 0 | 20.0 | 20.0 |
| Comparative Example C | 105.2 | 1.3 | 0 | 0 | 20.0 | 20.0 |
| Comparative Example D | 105.2 | 1.0 | 5.8 | 0 | 20.0 | 20.0 |
| 1 | 263.3 | 0 | 0 | 0 | 50.0 | 0 |
| 2 | 263.3 | 3.1 | 0 | 0 | 50.0 | 0 |
| 3 | 263.3 | 9.4 | 0 | 0 | 50.0 | 0 |

Films were cast from the compositions of Comparative Examples A–D and Examples 1–3 according to the General Method for Film Preparation—Tensile Testing. Test specimens from these prepared films were tested according to the Tensile Test. Results reported in Table 2 (below). In Table 2, "psi" means pounds per square inch.

TABLE 2

| | FILM PROPERTIES | | | | | |
|---|---|---|---|---|---|---|
| COMPOSITION | Load at 50% Strain, psi, (MPa) | Load at 100% Strain, psi, (MPa) | Load at 150% Strain, psi, (MPa) | Load at 200% Strain, psi, (MPa) | Load at Break, psi, (MPa) | % Elongation at Break |
| Comparative Example A | 1320 (9.10) | 1580 (10.5) | 1890 (13.0) | 2320 (16.0) | 7750 (53.4) | 589 |
| Comparative Example B | 2170 (15.0) | 2570 (17.7) | 3120 (21.5) | 3830 (26.4) | 8560 (59.0) | 455 |
| Comparative Example C | 2010 (13.9) | 2390 (16.5) | 2890 (19.9) | 2540 (17.5) | 8760 (60.4) | 499 |
| Comparative Example D | 1580 (10.9) | 1810 (12.5) | 2060 (14.2) | 2380 (16.4) | 4890 (33.7) | 447 |
| Example 1 | 1990 (13.7) | 2380 (16.4) | 2920 (20.1) | 3590 (24.8) | 6880 (47.5) | 361 |
| Example 2 | 2150 (14.8) | 2600 (18.0) | 3200 (22.1) | 3970 (27.4) | 8280 (57.1) | 418 |
| Example 3 | 2040 (14.1) | 2370 (16.4) | 2850 (19.7) | 3540 (24.4) | 7850 (54.1) | 407 |

Examples 4–8

Emulsions of compositions shown in Table 3 (below) were prepared according to the General Method of Emulsion Preparation.

TABLE 3

| | COMPONENT, parts | | | | | | | |
|---|---|---|---|---|---|---|---|---|
| EXAMPLE NUMBER | PU1 | C2, melted | S1 | LiSt | Water | PAA 1, 4 percent by weight in water | PAA 2, 4 percent by weight in water | NH₄OH |
| 4 | 267.1 | 50.7 | 3.2 | 0 | 300.2 | 28.8 | 0 | 0.9 |
| 5 | 252.0 | 47.9 | 6.0 | 15.1 | 300.2 | 28.8 | 0 | 0.9 |
| 6 | 267.1 | 50.7 | 3.2 | 0 | 300.2 | 28.8 | 0 | 0.9 |
| 7 | 267.1 | 50.7 | 3.2 | 0 | 300.2 | 0 | 28.8 | 0.9 |
| 8 | 350.0 | 66.5 | 0 | 0 | 321.0 | 28.8 | 0 | 0.9 |

Films were prepared from the compositions of Comparative Example A and Examples 4–8 according to the General Method for Film Preparation—Friction Testing. The cast films were then tested according to the Friction Test. Results obtained at a test temperature of 15° C. are reported in Table 4 (below).

TABLE 4

| Example | Coefficient of Static Friction | Coefficient of Kinetic Friction |
| --- | --- | --- |
| Comparative Example A | 1.003 | 0.980 |
| 4 | 0.364 | 0.300 |
| 5 | 0.322 | 0.239 |
| 6 | 0.341 | 0.284 |
| 7 | 0.659 | 0.439 |
| 8 | 0.445 | 0.517 |

Examples 9–16 and Comparative Example E

A continuous filament nonwoven web was made according to the procedure of Example 1 of U.S. Pat. No. 4,227,350 (Fitzer), the disclosure of which is incorporated herein by reference. Polycaprolactam (available commercially under the trade designation "ULTRAMID B3" from BASF Corporation, Polymers Division, Mount Olive, N.J.) was extruded at a pressure of 2800 psi (19 MPa) through a 60-inch (1.5 meter) long spinneret nominally having 2890 counter sunk, counter bored openings arranged in eight equal rows spaced 0.080 inch (0.2 cm) apart in a hexagonal close packed array, each opening having a diameter of 0.016 inch (0.4 mm), and having a land length of 0.079 inch (2.01 mm). The spinneret was heated to about 248° C. and positioned 12 inches (30 cm) above the surface of a quench bath, which was continuously filled and flushed with tap water at the rate of 0.5 gallon per minute (2 liters/min). Filaments extruded from the spinneret were permitted to fall into the quench bath, where they undulated and coiled between two 4-inch (10 cm) diameter by 60-inch (1.5 m) long smooth-surfaced rolls. Both rolls were positioned in the bath with their axes of rotation about 2 inches (5 cm) below the surface of the bath, and the rolls were rotated in opposite directions at a rate of about 9 ft/min (2.7 n/min) surface speed. The rolls were spaced to lightly compress the surfaces of the resultant extruded web, providing a flattened surface on both sides. The polycaprolactam was extruded at a rate of about 700 pounds per hour (320 kg/hr), producing a web that was 59 inches (1.5 m) wide×0.66 inch (17 mm) thick. The web had eight rows of coiled, undulated filaments. The resulting coiled web had a basis weight of 14.2 grams/24 square inches (0.875 kg/m$^2$), and had a void volume of 92.6 percent by volume. The filament diameter averaged about 15 mils (0.38 mm). The web was carried from the quench bath around one of the rolls and excess water was removed from the web by drying at room temperature (i.e., 20° C. to 24° C.) using forced air.

The nonwoven web prepared above was used to make Examples 9–16 and Comparative Example E by sequentially applying a make coat, mineral coat, and size coat, as described below.

A make coat, obtained by combining the ingredients shown in Table 5 (below), was applied to the nonwoven web using a 2-roll coater.

TABLE 5

| | EXAMPLES 9–16 | | COMPARATIVE EXAMPLE E | |
| --- | --- | --- | --- | --- |
| COMPONENT | Make Coat, parts | Size Coat, parts | Make Coat, parts | Size Coat, parts |
| C1 | 0 | 0 | 6.5 | 9.6 |
| C2 | 6.4 | 6.9 | 0 | 0 |
| PU1 | 0 | 0 | 37.7 | 27.5 |
| PU2 | 33.2 | 16.1 | 0 | 27.5 |
| S1 | 0.4 | 0.3 | 0 | 0 |
| Water | 56 | 54 | 0 | 0 |
| PAA 1 | 4 | 3.9 | 0 | 0 |
| Lampblack | 0 | 0 | 0.8 | 1.2 |
| Fumed Silica | 0 | 0 | 2 | 0 |
| Silane | 0 | 0 | 0.8 | 0.7 |
| Solvent 2 | 0 | 0 | 33.5 | 19.3 |
| Bentonite | 0 | 0 | 12.2 | 0 |
| Ammonium hydroxide | 0.123 | 0.123 | 0 | 0 |
| LiSt | 0 | 0 | 0 | 4.7 |

The indicated make coat was applied at a dry add-on weight of 6.5 g/24 in$^2$ (0.420 kg/m$^2$). Grade 36 SiC abrasive granules (2.6 kg/m$^2$) were then applied to the coated web via a drop coater. The web was agitated to encourage penetration of the granules into the interstitial spaces of the web. The particle-coated web was then heated by passing it through a 90 ft (27 m) long oven. A size coat having the composition indicated in Table 3 was then sprayed on the upper side of the web, which was then heated in an oven. The web was inverted and the other side was sprayed with an identical amount of the size coating and heated in an oven under the same conditions. The final size coat dry add-on was 7.78 g/24 in$^2$ (0.503 kg/m$^2$). Discs ((10-inch (25.4 mm) outer diameter, 2-inch (5.1 mm) inner diameter) were cut from the resulting nonwoven abrasive articles and were tested according to the Wear Test. Curing conditions used for the make and size coatings, and Wear Test results are reported in Table 6 (below).

TABLE 6

| EXAMPLE | MAKE COAT CURE TEMP, ° C. | MAKE COAT LINE SPEED, ft/min (m/min) | NUMBER OF MAKE COAT OVEN PASSES | SIZE COAT CURE TEMP, ° C. | SIZE COAT LINE SPEED, ft/min (m/min) | WEAR, g/2 min | CUT, g/2 min |
| --- | --- | --- | --- | --- | --- | --- | --- |
| COMPARATIVE EXAMPLE E | 165 | 10 (3.0) | 1 | 160 | 10 (3.0) | 81.3 | 17.97 |
| 9 | 165 | 10 (3.0) | 2 | 175 | 7.5 (2.3) | 39.1 | 25.45 |
| 10 | 175 | 10 (3.0) | 1 | 175 | 7.5 (2.3) | 36.7 | 18.64 |
| 11 | 165 | 7.5 (2.3) | 1 | 175 | 7.5 (2.3) | 48.9 | 26.34 |
| 12 | 165 | 5 (1.5) | 1 | 175 | 7.5 (2.3) | 37.2 | 23.12 |
| 13 | 175 | 10 (3.0) | 1 | 175 | 7.5 (2.3) | 41.9 | 23.12 |
| 14 | 175 | 7.5 (2.3) | 1 | 175 | 7.5 (2.3) | 40.8 | 25.21 |

TABLE 6-continued

| EXAMPLE | MAKE COAT CURE TEMP, °C. | MAKE COAT LINE SPEED, ft/min (m/min) | NUMBER OF MAKE COAT OVEN PASSES | SIZE COAT CURE TEMP, °C. | SIZE COAT LINE SPEED, ft/min (m/min) | WEAR, g/2 min | CUT, g/2 min |
|---|---|---|---|---|---|---|---|
| 15 | 185 | 10 (3.0) | 1 | 175 | 7.5 (2.3) | 38.1 | 22.66 |
| 16 | 185 | 7.5 (2.3) | 1 | 175 | 7.5 (2.3) | 35.9 | 23.63 |

General Procedure for Injection Molding a Unitary Brush

An injection molded radial bristle brush having forty 2.2 cm long integral bristles, a 3.8 cm hub, a 7.6 cm diameter, and a weight of 1.65 g was molded from polyamide 11 (obtained under the trade designation "BESNO P40TL" from Elf Atochem, Arlington Heights, Ill.). A single-cavity mold was employed. The injection-molding machine used was a 220-ton (200,000 kg) clamping force machine from Cincinnati Milacron, Batavia, Ohio, which employed a single shot extruder with a general purpose screw. Molding parameters were: nozzle temperature 232° C., temperature at the front of the barrel (proximate the nozzle) 216° C., temperature at the rear of the barrel (proximate the hopper) 232° C., screw rotation 75 percent of maximum, 2760–3450 kPa injection pressure, and a 2.3 cm length.

Comparative Examples F–G and Example 17

Twelve injection-molded brushes were prepared according to the General Procedure for Injection Molding a Unitary Brush. Adhesive compositions used to coating each brush are reported in Table 7.

The brushes were mounted on an electrically driven mandrel with 3.8 cm wide and 1.3 cm thick polytetrafluoroethylene spacers between each brush, rotated at about 15 rpm, submerged in the adhesive composition for about 10 seconds while the rotation continued, removed from the adhesive composition, and rotated at about 300 rpm for about 10 seconds to remove excess adhesive. The resultant coating was applied at a targeted dry add-on weight of from 0.5 to 0.6 g per brush.

The mandrel was transported to a spray booth, where abrasive particles (marketed under the trade designation "CUBITRON 222 GRADE 100" by 3M Company) were applied via a spray gun to the wet first coating on each brush. The abrasive particles were applied to both sides of eleven of the brushes until no additional abrasive particles would adhere to the wet first coatings, which was in the range from to 5 g per brush. The abrasive coated brushes were then heated to 130° C. for 45 minutes to harden the first coating and secure the abrasive particles to the injection molded brushes. A brush without abrasive particles was also heated under the same conditions (to aid in the calculation of the first coating dry weight). Following heating, a second coating (having the same composition as that of the first coating) was applied to all the brushes. This second coating served to further secure the abrasive particles to the brushes. The second coating was applied in an identical manner to that of the first coating, with the exception that the rotation period at 300 rpm was extended to about 15 seconds. The resultant second coating had a dry weight of from 0.4 g to 0.5 g per brush. The brushes were subsequently heated in an oven set at 130° C. for 45 minutes to harden the second coating. Following removal from the mandrel, two of the cured abrasive coated brushes were stacked one upon another and secured with a metal adaptor to make a larger radial abrasive article for testing.

Comparative Examples F–G and Example 17 were evaluated for cut and wear according to the following procedure. Abrasive articles prepared as described above were mounted on an electric drill (Black & Decker, "Professional 1046 Holgun Drill Type 101", ¼" VSR, 120V, 5.0 A, 2500 RPM) via a mandrel and rotated at about 2500 rpm against the face of an 11 inches (28 cm)×24 inches (61 cm)×⅝ inch (1.6 cm) thick particle board workpiece. The rotating coated brush was oriented with its radial direction perpendicular to the workpiece. The contact pressure between the brush and particle board was provided by the weight of the drill. The coated brush was allowed to dig into the surface of the particle board. The test duration was one hour. Workpiece and abrasive brush weights were measured every 10 minutes to determine cut (i.e., weight loss of the workpiece) and wear (i.e., weight loss of the brush) and are reported in Table 7.

TABLE 7

| COMPONENT | COMPARATIVE EXAMPLE F, parts | COMPARATIVE EXAMPLE G, parts | EXAMPLE 17, parts |
|---|---|---|---|
| PU1 | 173.6 | 106.5 | 111.5 |
| PU3 | 367.1 | 225.1 | 235.6 |
| S1 | 0 | 0 | 4.0 |
| C1 | 150.0 | 0 | 0 |
| C2 | 0 | 50.6 | 52.9 |
| Solvent 1 | 221.1 | 205.8 | 0 |
| Water | 0 | 0 | 181.0 |
| PAA 1, 3 percent by weight in water | 0 | 0 | 29.2 |
| N,N-dimethyl-2-ethanolamine | 0 | 0 | 1.05 |
| WEAR TEST RESULTS | | | |
| Cut, g | 17.4 | 21.3 | 24.9 |
| Wear, g | 1.8 | 2.0 | 1.3 |

Various modifications and alterations of this invention will become apparent to those skilled in the art without departing from the scope and spirit of this invention, and it should be understood that this invention is not to be unduly limited to the illustrated embodiments set forth herein.

What is claimed is:

1. An abrasive article comprising abrasive particles and a polymerized reaction product of a curable emulsion, wherein the curable emulsion comprises:
   an oil phase comprising blocked polyisocyanate and curative; and
   an aqueous phase, wherein the aqueous phase comprises:
      water; and
      at least partially neutralized crosslinked copolymer of monomers comprising at least one free-radically polymerizable carboxylic acid and at least one of an alkyl or alkaryl (meth)acrylate, wherein the at least one alkyl or alkaryl (meth)acrylate has from 11 carbon atoms to 34 carbon atoms, and further wherein the aqueous phase has a pH in a range of from about 4 to about 10.

2. The abrasive article of claim 1, wherein the curable emulsion further comprises nonionic surfactant, and further wherein the amount of nonionic surfactant is less than 5 percent by weight, based on the total weight of the oil phase.

3. The abrasive article of claim 1, wherein the reaction product is free of grinding aid.

4. The abrasive article of claim 1, wherein the reaction product is free of filler.

5. The abrasive article of claim 1, wherein the abrasive article comprises a coated abrasive article.

6. The abrasive article of claim 5, wherein the coated abrasive article comprises:
   a backing;
   a make coat in contact with at least a portion of the backing;
   abrasive particles, wherein the abrasive particles contact the make coat; and
   a size coat, wherein the size coat contacts at least a portion of the make coat and at least one abrasive particle, and further wherein at least one of the make coat and the size coat comprises the reaction product.

7. The abrasive article of claim 5, wherein the coated abrasive article further comprises a backing and an abrasive coat in contact with the backing, wherein the abrasive coat comprises a cured slurry of a binder precursor and abrasive particles, and further wherein the slurry coat comprises the reaction product.

8. The abrasive article of claim 5, wherein the coated abrasive article has a form selected from the group consisting of a belt, a roll, a disc, and a sheet.

9. The abrasive article of claim 1, wherein the abrasive article comprises a nonwoven abrasive article.

10. The abrasive article of claim 9, wherein the nonwoven abrasive article comprises a lofty open fiber web.

11. The abrasive article of claim 9, wherein the nonwoven abrasive article comprises continuous filaments.

12. The abrasive article of claim 9, wherein the nonwoven abrasive article has a form selected from the group consisting of a sheet, a disc, a belt, a roll, a wheel, a hand pad, a cleaning brush, and a block.

13. The abrasive article of claim 1, wherein the abrasive article is a bonded abrasive article.

14. The abrasive article of claim 13, wherein the bonded abrasive article has a form selected from the group consisting of a wheel, a honing stone, and a mounted point.

15. The abrasive article of claim 1, wherein the abrasive article comprises a unitary brush comprising bristles having a first flexural modulus, and abrasive particles adhered to at least a portion of the bristles by the reaction product, further wherein the reaction product has a second flexural modulus.

16. The abrasive article of claim 15, wherein the second flexural modulus is within 20 percent of the value first flexural modulus.

17. The abrasive article of claim 15, wherein the unitary brush is a cup brush or a radial brush.

18. The abrasive article of claim 1, wherein the blocked polyisocyanate comprises a compound having the formula:

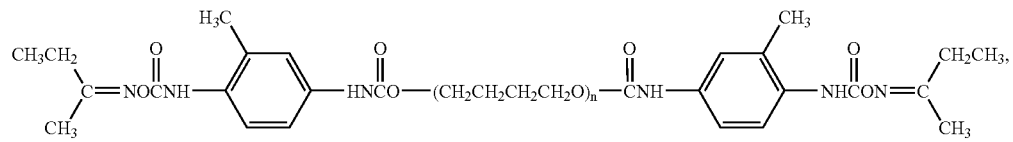

wherein n is an integer greater than or equal to 1.

19. The abrasive article of claim 1, wherein the curative comprises at least one of bis(4-amino-3-ethylphenyl)methane or bis(4-amino-3,5-diethylphenyl)methane.

20. A method of abrading a workpiece comprising:
   providing an abrasive article comprising:
      abrasive particles and a polymerized reaction product of a curable emulsion,
      wherein the curable emulsion comprises:
         an oil phase comprising blocked polyisocyanate and curative;
         an aqueous phase, wherein the aqueous phase comprises:
            water; and
            at least partially neutralized crosslinked copolymer of monomers comprising at least one free-radically polymerizable carboxylic acid and at least one of an alkyl or alkaryl (meth)acrylate, wherein the at least one alkyl or alkaryl (meth)acrylate has from 11 carbon atoms to 34 carbon atoms, and further wherein the aqueous phase has a pH in a range of from about 4 to about 10; and
   frictionally contacting at least one abrasive particle with the surface of a workpiece; and
   moving at least one of the at least one abrasive particle or the workpiece relative to the other to abrade at least a portion of the surface with the abrasive particle.

21. The method of claim 20, wherein the curable emulsion further comprises nonionic surfactant, and further wherein the amount of nonionic surfactant is less than 5 percent by weight, based on the total weight of the oil phase.

* * * * *